(12) United States Patent
Koren et al.

(10) Patent No.: US 6,831,686 B1
(45) Date of Patent: Dec. 14, 2004

(54) METHOD AND DEVICE FOR THE EXPOSURE-DEPENDENT NOISE CORRECTION IN IMAGE SENSORS WHICH CAN BE ADDRESSED IN LINES AND COLUMNS

(75) Inventors: Ivo Koren, München (DE); Heribert Geib, Grafing (DE); Ulrich Ramacher, München (DE)

(73) Assignee: Infineon Technologies, AG, Munich (DE)

(*) Notice: Subject to any disclaimer, the term of this patent is extended or adjusted under 35 U.S.C. 154(b) by 0 days.

(21) Appl. No.: 09/806,633

(22) PCT Filed: Sep. 17, 1999

(86) PCT No.: PCT/DE99/02991

§ 371 (c)(1),
(2), (4) Date: Mar. 30, 2001

(87) PCT Pub. No.: WO00/19711

PCT Pub. Date: Apr. 6, 2000

(30) Foreign Application Priority Data

Sep. 30, 1998 (DE) .......................................... 198 45 067

(51) Int. Cl.[7] .......................... H04M 9/64; H04M 5/217
(52) U.S. Cl. ...................................... 348/243; 348/241
(58) Field of Search ................................. 348/241, 243, 348/246, 247, 248, 251, 252, 255, 257, 229.1, 222.1; 382/275, 254, 274; 358/518, 529, 532; 250/208.1; 257/292, 293

(56) References Cited

U.S. PATENT DOCUMENTS

| 5,129,595 A | 7/1992 | Thiede et al. |
| 5,331,428 A | 7/1994 | Uffel |
| 5,455,622 A | 10/1995 | Compton |
| 5,631,466 A | 5/1997 | Botti et al. |

FOREIGN PATENT DOCUMENTS

| EP | 0 677 957 A | 10/1995 |
| WO | WO 98/56168 | 12/1998 |
| WO | WO 99/03262 | 1/1999 |

*Primary Examiner*—Aung Moe
(74) *Attorney, Agent, or Firm*—Peter F. Corless; Steven M. Jensen; Edwards & Angell, LLP

(57) ABSTRACT

Method and device for the exposure-dependent noise correction in images sensor which can be addressed in lines and columns are converted into digital values and an offset voltage correction is carried out by a summer, a gain correction is carried out by a multiplier, and an exposure-dependent dark current correction is carried out by a further summer. Further, the coefficients that depend on the line number, the column number and the integration time, are determined by linear approximations. As a result, the fixed pattern noise (PFN) in CMOS image sensor can be efficiently suppressed with a relatively low outlay.

9 Claims, 3 Drawing Sheets

METHOD AND DEVICE FOR THE EXPOSURE-DEPENDENT NOISE CORRECTION IN IMAGE SENSORS WHICH CAN BE ADDRESSED IN LINES AND COLUMNS

FIELD OF THE INVENTION

The invention relates primarily to a CMOS image sensor, which, in contrast to a CCD sensor, can be addressed directly, like a customary random access memory. In a CMOS sensor, fluctuations in the technological parameters lead, in addition to a 1/f noise of the individual pixels, to a noise (fixed pattern noise, FPN) essentially corresponding to a fixed image pattern. This noise is caused by production-dictated fluctuations in the threshold voltage of the transistors (offset FPN), the gain between the read-out path (gain FPN) and the leakage currents in the sensor cells (dark FPN).

The offset noise of an individual pixel can be suppressed for example by multiple sampling and correlation of the values read out (correlated double sampling, CDS). In order to correct the offset FPN, it is possible, for example, to carry out a subtraction with a reference image recorded with the diaphragm closed, the reference image being recorded anew after each image or, alternatively, only being recorded once. If such a reference image is recorded each time, the maximum possible image rate is greatly reduced, and if the reference image is only recorded once, dark current correction is possible only with difficulty. A further possibility is to read an always darkened line and subtract it from the content of the line memory, thereby resulting in a saving of memory but only partial correction of the dark current. In high end systems, for example, a gain FPN correction is subsequently carried out with digital signal processing, the correction being carried out by pixel-by-pixel multiplication of signal by stored correction coefficient and requiring a very high outlay on hardware and memory.

The object on which the invention is based consists, then, in specifying a method and a device for the exposure-dependent noise correction in image sensors which can be addressed in lines and columns which enables maximum quality of the correction of the FNP noise in conjunction with a low outlay.

This object is achieved according to the invention by means of the features of patent claim 1 with regard to the method, and by means of the features of patent claim 6 with regard to the device. Further claims relate to advantageous refinements of the method according to the invention and of the device according to the invention.

Particular advantages of the invention reside in the programmability of the correction parameters and in the fact that the FNP correction can be coordinated with the illumination conditions and the correction components can be switched on and off individually.

DETAILED DESCRIPTION OF THE DRAWINGS

The invention is explained in more detail below using preferred exemplary embodiments illustrated in the drawings, in which.

DETAILED DESCRIPTION

The essence of the invention is that, in a first step, either an A/D conversion with high resolution is carried out or better, because it is faster, an A/D conversion with a lower resolution and subsequent characteristic linearization is carried out, and, in a second step, a voltage offset which occurs column by column on account of the reading units that are present column by column is corrected, and, in a third step, a correction of inhomogeneities of the pixel sensitivity and of the losses as a result of charge reversal processes is carried out, and, in a fourth and last step, the dark current of a pixel is corrected, said dark current predominantly being attributable to leakage currents in the pixel.

Figure 1:
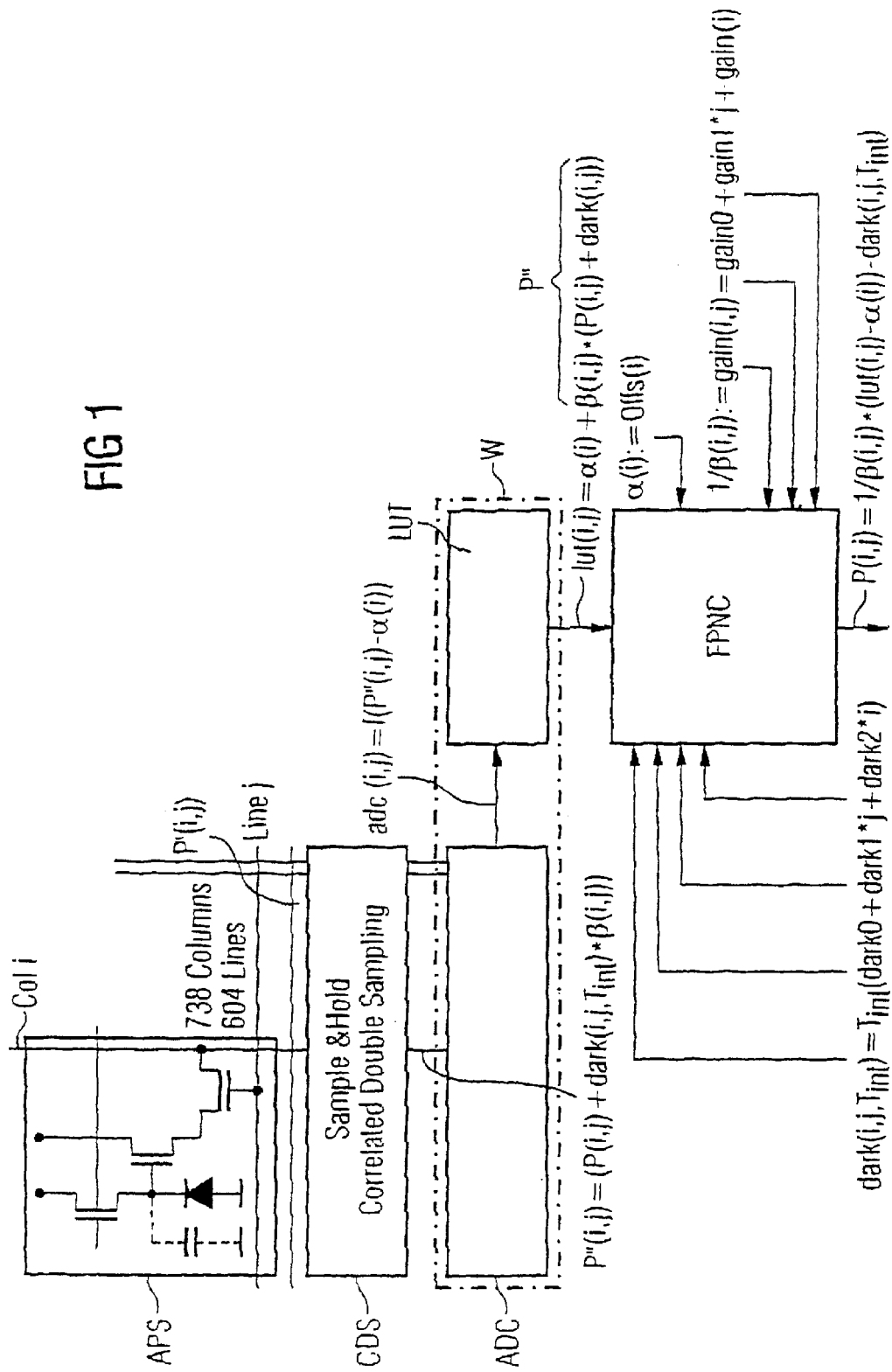
FIG. 1 shows a diagram for elucidating a method according to the invention.

FIG. 1 illustrates a block diagram containing a pixel sensor array APS, a correlation unit CDS connected downstream, an analog-to-digital converter W connected downstream of said unit CDS, and, finally, a correction unit FPNC. The converter W comprises, for example, an A/D converter having high resolution, e.g. 10 ... 12 bits, or in this case an A/D converter having a lower resolution, e.g. 8 bits, and a linearization unit LUT connected downstream of the converter. The memory array APS is indicated merely by columns Col i and lines Line j and by a pixel sensor cell shown by way of example. The lines for the columns Col i are connected via the correlation unit CDS in each case to an associated analog-to-digital converter of a converter module ADC. From the pixel sensor array, pixel values P'(i,j) affected by a dark current noise dark(i,j,$T_{int}$), an offset noise and a gain noise are read out into the correlation unit and the correlation unit supplies pixel values P"(i,j) which are freed of the offset noise of the individual pixels but are affected by an additional gain noise, for the analog-to-digital converters. The output signal adc (i,j) generated by the respective analog-to-digital converter can be described by the following relationship:

$$adc(i,j)=f(P"(i,j)+\alpha(i,j))$$

since the pixel values P"(i,j) are affected by an offset by the correlation unit and the analog-to-digital converter and a functional relationship between input and output variables is effected by the converter. An analog-to-digital converter from the module ADC has, for example, a resolution of 8 bits and, by means of its output signal adc(i,j), addresses the linearization unit LUT in the form of a stored table of values (look up table) whose output word width is 12 bits, for example. The linearization is performed as follows: from the stepped assignment function of the analog-to-digital converter, a lower step value associated with the signal adc(i,j) and an upper step value are taken as a basis, and, from these two values, the median value is output with an increased resolution, that is to say in this case with 12 bits, for example. This method ensures very low integral non-linearity which is comparable to a customary linear analog-to-digital converter with an accuracy of 11 to 12 bits. The 8-bit digital-to-analog converter used has a nonlinear characteristic which allows finer quantization for small signal levels. Since a lower accuracy suffices for large gray-scale values, the image quality is comparable to a 10-bit converter, but the conversion is faster.

The linearization unit LUT supplies a signal lut(i,j), which can be described as follows:

$$lut(i,j)=\alpha(i)+\beta(i,j)*(P(i,j)-dark(i,j))$$

In the actual correction unit FPNC, a corrected pixel value P(i,j) is then determined according to the following relationship:

$$P(i,j)=1/\beta(i,j)*(\text{lut}(i,j)-\alpha(i))-\text{dark}(i,j,T_{int})$$

where the parameters $\alpha(i)$, $1/\beta(i,j)$ and $\text{dark}(i,j,T_{int})$ are determined beforehand and fed to the correction unit FPNC.

Figure 2:
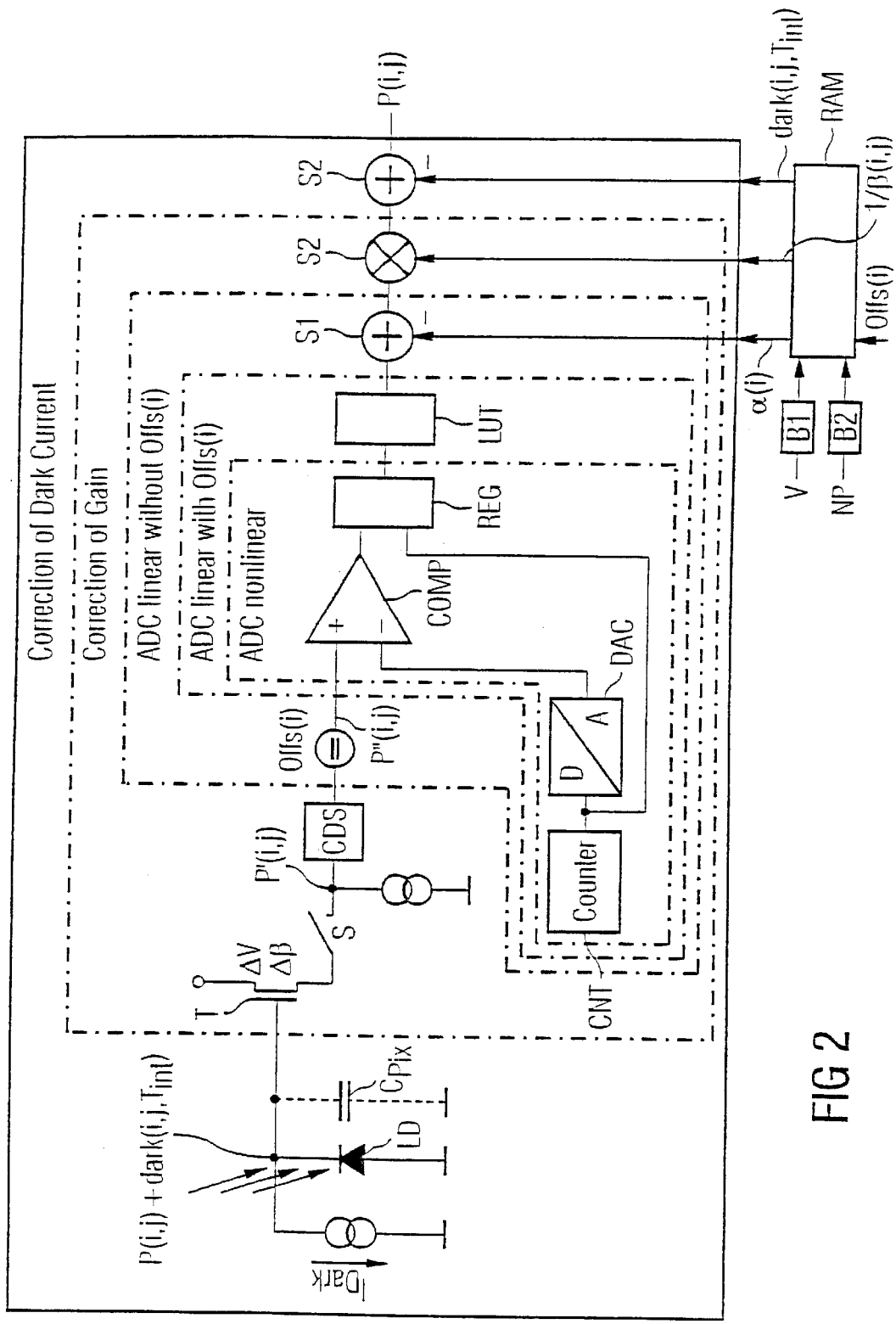
FIG. 2 shows a block diagram for elucidating the device according to the invention.

A corresponding device is shown in FIG. 2, where an individual pixel sensor is represented by its equivalent circuit and, via an amplifier transistor T and an electronic selection switch S, switches the pixel values $P(i,j)+\text{dark}(i,j,T_{int})$ to the input of the correlation unit CDS. In this case, the analog-to-digital converter is in the form of a circuit comprising a comparator COMP, a register REG, a counter CNT and a digital-to-analog converter DAC, the operational amplifier comparing the analog output value of the digital-to-analog converter with the analog input signal, the digital-to-analog converter being supplied by a counter CNT on the input side and the counter reading of the counter being accepted into the register REG if the analog input signal corresponds to the output signal of the digital-to-analog converter. A linearization unit LUT is also indicated here, which, on the input side, is connected to the analog-to-digital converter, that is to say to the output of the register REG. The output values of the linearization unit LUT are fed to a first summer S1, whose output is connected to an input of a multiplier M. The output of the multiplier M is connected to an input of a second summer S2, which supplies the corrected pixel values $P(i,j)$. The second inputs of the summers and of the multiplier are connected to a random access memory RAM, the latter supplying offset values $\alpha(i)$, inverse gain values $1/\beta(i,j)$ and dark current values $\text{dark}(i,j,T_{int})$. The offset value $\alpha(i)$ is subtracted in the summer S1. For $\alpha(i)$, offset values Offs(i) for each column are stored for each column. Values for the inverse gain $1/\beta(i,j)$ are formed from exposable pixel sensors V in a first calculation unit B1. Dark current values $\text{dark}(i,j,T_{int})$ are calculated from non-exposable pixel sensors by means of a second calculation unit B2, stored in the random access memory and fed to the summer S2 with a negative sign.

Figure 3:
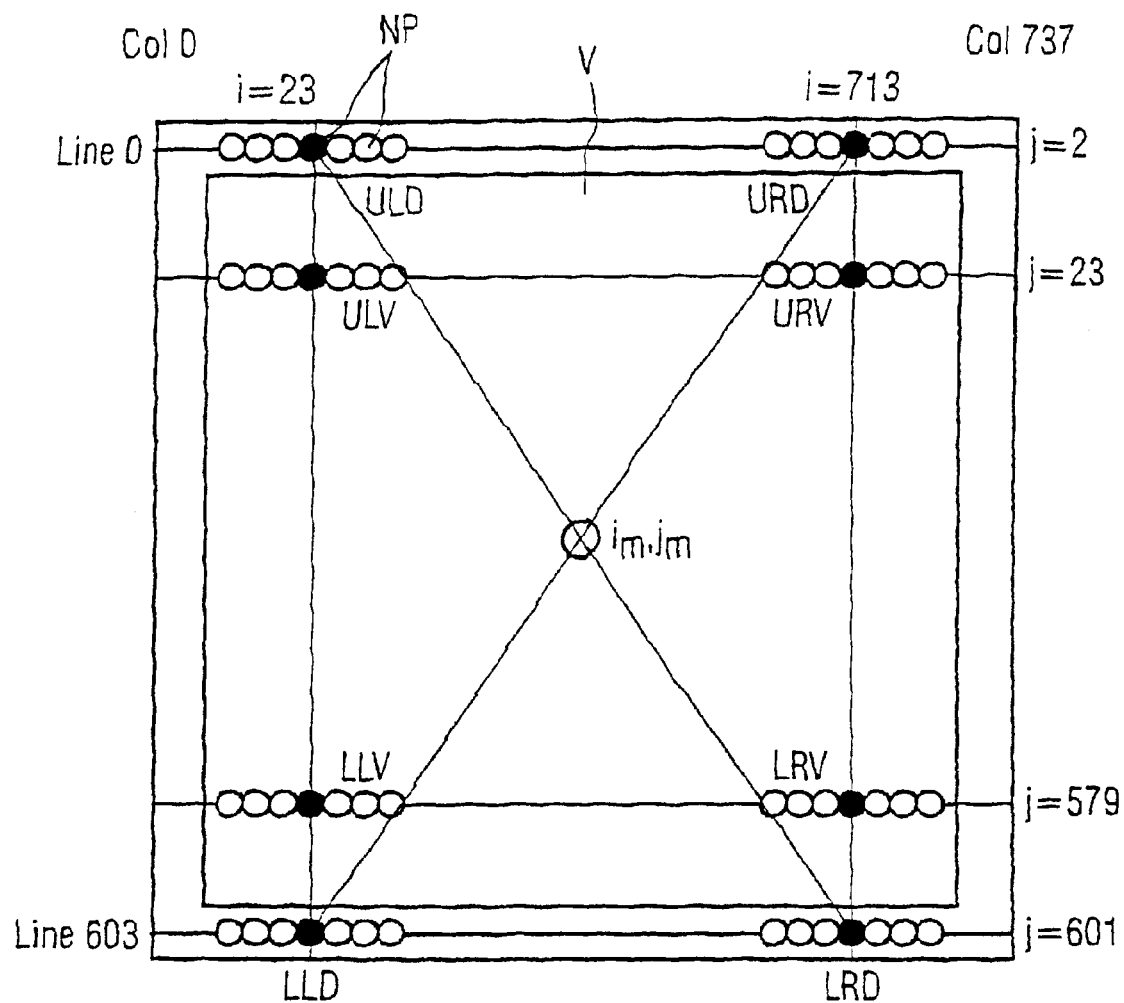
FIG. 3 shows a pixel sensor array with exposed and unexposed pixels.

FIG. 3 illustrates an image sensor which can be addressed in lines and columns, with exposable pixel sensors V and non-exposable pixel sensors NP. In this case, the image sensor has, for example, lines Line 0 . . . Line 603 and columns Col 0 . . . Col 737. A left selected column is the column i=23 and a right selected column is the column i=713. Furthermore, a selected upper line is specified by j=23 and a lower selected line is specified by j=579 in the exposable image area. Finally, a line j=2 and a line j=601 in the non-exposable area of the image sensor array are also illustrated. A non-exposable upper left pixel sensor ULD having the coordinates i=23 and j=2, a non-exposable upper right pixel sensor having the coordinates i=713 and j=2, a non-exposable left lower pixel sensor LLD having the coordinates i=23, j=601 and a non-exposable right lower pixel sensor LRD having the coordinates i=713 and j=601 are likewise specified. An upper left pixel sensor having the coordinates i=23 and j=23, an upper right pixel sensor having the coordinates i=713 and j=23, a lower left pixel sensor 4 having the coordinates i=23 and j=579 and a lower right pixel sensor LRV having the coordinates i=713 and j=579 are illustrated in the exposable area of the image sensor array. Finally, a median line number jm and a median column number are also specified in FIG. 3.

In order to determine the offset Offs(i) or $\alpha(i)$, a non-exposed line, for example the line i=2, is read out completely, with the integration time $T_{int}$ set to be minimal, and is converted by the analog-to-digital converters and subsequently corrected by the linearization unit LUT and written to the random access memory RAM as value $\alpha(i)$. Since the offset-corrected signal also has an amplitude response in the line and column direction which is governed by a changing gain factor, the offset-corrected signal must be multiplied by the respective inverse gain factor $1/\beta(i,j)$.

Deviations in the gain of the source follower with the transistor T and a pixel capacitance $C_{Pix}$ in FIG. 2 govern a dependence of the factor on line i and column j. The source follower in the pixel sensor cooperates with a current source in each column, so that the fluctuations of the gain factor are also more pronounced in the column direction than in the line direction; fluctuations of the column capacitance also contribute to this. For this reason, in the line direction only the gradient of the gain is corrected, whereas in the column direction the correction is effected individually for each column. To that end, the correction values, as in the case of the offset, are stored in a random access memory RAM. The inverse gain $1/\beta(i,j)$ is given by the following relationship:

$$1/\beta(i,j)=\text{gain}=1+\text{gain}(i)+\text{gain}1*j$$

In order to determine the values for gain(i) and gain1, use is made of a uniform bright illumination, for example the recording of a white sheet of paper, with an integration time $T_{int}$, which is chosen such that the analog-to-digital converters experience virtually a maximum drive level, that is to say, for example, about 80 percent of the maximum drive level. An average drive level over the entire sensor area can be calculated as follows:

$$drv.1. = \frac{1}{i_{max} j_{max}} \sum_{i=1}^{i_{max}} \sum_{j=1}^{j_{max}} P(i,j)$$

The parameters Gain (i) and Gain1 are determined by reading the pixel values from the sensor array and subsequent calculation. The parameters are determined in such a way that the transfer factor becomes as homogeneous as possible over the sensor area. One possible method is to minimize the mean square value for the FPN. When this method is employed, the following relationships are produced after a few simplifications:

$$gain1 = \frac{1}{(j_2-j_1)j_{max}} \frac{1}{drv.1.} \left[\sum_{i=1}^{i_{max}} P(i, j_2) - \sum P(i, j_1)\right]$$

$$gain(i) = \left[\frac{1}{j_{max}} \frac{1}{drv.1.} \sum_{j=1}^{j_{max}} P(i, j)\right] - 1 - gain1\frac{j_{max}+1}{2},$$

where $i_{max}$ is the maximum column number of an exposed column, $j_{max}$ is the maximum line number of an exposed line and $j_1$ and $j_2$ are two different lines.

By using a constant Gain0 other than "1" in the equation for Gain, one bit can be saved in the word width for Gain, because Gain lies in the range between 0.5 and <1.0, that is to say does not assume the value 1.0 at all. The dark current is corrected in a manner dependent on the integration time $T_{int}$. In order to save storage capacity, only the gradient is corrected. The value for the dark current $\text{Dark}(i,j,T_{int})$ is calculated according to the following formula:

$$\text{Dark}(i,j)T_{int}=T_{int}*(\text{Dark}0+\text{Dark}1*j+\text{Dark}2*i).$$

The coefficients are determined with the aid of the non-exposed pixels, the integration time $T_{int}$ being chosen to be long enough that approximately 50 percent of the maximum drive level of the sensor is reached. The values for the pixels ULD, URD, LLD, LRD in FIG. 3 are used to calculate the coefficients.

The coefficients Dark0 ... Dark2 are calculated as follows:

Dark1=½*(ULD+URD−LLD−LRD)/Δj

Dark2=½*(URL+LRD−ULD−LLD)/Δi

Dark0=¼*(ULD+URD+LLD+LRD)−Dark1*$j_m$−Dark2*$i_m$ where $i_m$ is a median column between ULD and URD and $j_m$ is a median line between ULD and ULV and $j_m$ is in this case chosen to be 288, for example, and $i_m$ is in this case chosen to be 360, for example.

What is claimed is:

1. A method for the exposure-dependent noise correction in image sensors which can be addressed in lines and columns, in which signals from the individual pixel sensors, which signals have been freed of the offset noise, are converted into digital pixel values (adc(i,j)), in which corrected pixel values (P(i,j)) are obtained from the digital pixel values as follows: firstly the digital pixel values are reduced by an offset value ($\alpha(i)$) determined in each case for a column, secondly the pixel value thus reduced is multiplied by an inverse gain ($1/\beta(i,j)$) determined by an approximation, and thirdly a dark current value (dark(i,j)$T_{int}$)) determined by a further approximation is subtracted from this product.

2. The method as claimed in claim 1, in which, column (i), the offset value ($\alpha(i)$) is determined as follows: given a minimal integration time, a line with non-exposable pixels (NP) is read out, converted into digital values, linearized and stored as offset values.

3. The method as claimed in claim 1, in which, given a uniform, virtually full drive level, exposed pixels (V) are read out and the inverse gain $1/\beta(i,j)$ is determined by the following calculations:

$1/\beta(i,j)$=gain0+gain($i$)+gain*$j$, where gain0=1, $$drv.1. = \frac{1}{i_{max} j_{max}} \sum_{i=1}^{i_{max}} \sum_{j=1}^{j_{max}} P(i, j),$$

$$gain1 = \frac{1}{(j_2 - j_1) j_{max}} \frac{1}{drv.1.} \left[ \sum_{i=1}^{i_{max}} P(i, j_2) - \sum P(i, j_1) \right] \text{ and}$$

$$gain(i) = \left[ \frac{1}{j_{max}} \frac{1}{drv.1.} \sum_{j=1}^{j_{max}} P(i, j) \right] - 1 - gain1 \frac{j_{max} + 1}{2},$$

where i is the column number, j is the line number, $i_{max}$ is the maximum column number of an exposed column, $j_{max}$ is the maximum line number of an exposed line and j1 and j2 are two different columns.

4. The method as claimed in claim 1, in which, instead of Gain0=1, a value of between 0.5 and less than 1 is chosen for Gain0.

5. The method as claimed in claim 1, in which, given an integration time ($T_{int}$) for an approximately 50 percent drive level, non-exposable pixels ULD, URD, LLD and LRD are read out and the dark current is determined therefrom by the following calculations:

$$Dark1 = \frac{1}{2} * \frac{(ULD + URD - LLD - LRD)}{\Delta j},$$

$$Dark2 = \frac{1}{2} * \frac{(URL + LRD - ULD - LLD)}{\Delta i} \text{ and}$$

$$Dark0 = \frac{1}{4} *(ULD + URD + LLD + LRD) - Dark1 * j_m - Dark2 * i_m,$$

where Δj is the number of lines between an upper (ULD, URD) and a lower (LLD, LRD) non-exposed line and $j_m$ is a median column number and $i_m$ is a median line number.

6. A device for the exposure-dependent noise correction in image sensors which can be addressed in lines and columns, in which a pixel sensor array (APS) is present which supplies noisy pixels (P(i,j)+dark(i,j,$T_{int}$)) to a correlation unit (CDS), which, for its part, supplies pixels (P"(i,j)) which are freed of the offset noise of the individual pixels to an analog-to-digital converter (ADC), in which a linearization unit (LUT) is present which matches the digital output values (adc(i,j)) of the analog-to-digital converter having a relatively high resolution better to the associated analog value, in which the following are connected downstream of the linearization unit (LUT), in order, a first summer (S1) for the subtraction of an offset value ($\alpha(i)$), determined in each case for a column, a multiplier (M) for multiplication by an inverse gain ($1/\beta(i,j)$), and a second summer (S2) for subtraction of a dark current value (Dark(i,j,$T_{int}$)).

7. The device as claimed in claim 6, in which a random access memory (RAM) is present for storing offset values, inverse gain values and dark current values.

8. The device as claimed in claim 6, in which a first calculation unit (B1) is present which determines a linear approximation of an inverse gain ($1/\beta(i,j)$) from exposed pixels (V).

9. The device as claimed in claim 8, in which a second calculation unit (B2) is present which determines a linear approximation of an exposure-time-dependent dark current (Dark(i,j,Tint)) from unexposed pixels (NP).

* * * * *